United States Patent
Rudolf et al.

(10) Patent No.: US 7,551,598 B2
(45) Date of Patent: *Jun. 23, 2009

(54) SYNCHRONIZATION SIGNAL FOR SYNCHRONIZING BASE STATIONS

(75) Inventors: Marian Rudolf, Rennes (FR); Bruno Jechoux, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/931,560

(22) Filed: Oct. 31, 2007

(65) Prior Publication Data

US 2008/0062959 A1 Mar. 13, 2008

Related U.S. Application Data

(62) Division of application No. 11/184,917, filed on Jul. 20, 2005, which is a division of application No. 10/192,639, filed on Jul. 11, 2002, now Pat. No. 6,930,996, which is a division of application No. 09/962,271, filed on Sep. 26, 2001, now Pat. No. 6,922,406.

(30) Foreign Application Priority Data

Oct. 3, 2000 (FR) .................................. 00 12765

(51) Int. Cl.
H04L 7/00 (2006.01)
(52) U.S. Cl. .................. 370/350; 370/335; 370/343
(58) Field of Classification Search ................. 370/324, 370/342, 347, 350
See application file for complete search history.

(56) References Cited

U.S. PATENT DOCUMENTS

| 5,559,723 A | * | 9/1996 | Mourot et al. | 375/229 |
| 5,566,172 A | * | 10/1996 | Mourot | 370/347 |
| 6,141,373 A | | 10/2000 | Scott | |
| 6,567,482 B1 | * | 5/2003 | Popovic' | 375/343 |

FOREIGN PATENT DOCUMENTS

| EP | 0 892 504 A2 | 1/1999 |
| WO | WO 00/14915 | 3/2000 |
| WO | WO 00/54424 | 9/2000 |

OTHER PUBLICATIONS

P. Spasojevic, Dec. 1999, "Complementary Sequences for ISI Channel Estimation" (Dec. 1999, chapter VI, pp. 89-109).*
3GPP TS 25.223 V3.7.0 (Sep. 2001), 3rd Generation Partnership Project; Technical Specification Group Radio Access Network; Spreading and Modulation (TDD) (Release 1999).

(Continued)

*Primary Examiner*—Dang T Ton
*Assistant Examiner*—Pamit Kaur
(74) *Attorney, Agent, or Firm*—Oblon, Spivak, McClelland, Maier & Neustadt, P.C.

(57) ABSTRACT

A synchronization signal used to synchronize base stations in a mobile radio telecommunication system having a first sequence followed by a second sequence, the first and second sequences being polyphase complementary sequences configured such that when the synchronization signal is correlated with a replica of the first sequence and a replica of the second sequence, and the correlation results are added, exemplary synchronization results are obtained.

4 Claims, 4 Drawing Sheets

OTHER PUBLICATIONS

C. Tellambura et al., IEEE Communication Letters, vol. 2, No. 5, pp. 140-142, "Channel Estimation Using Aperiodic Binary Sequences," May 1998.

P.Spasojevic et al.., IEEE International Symposium on Information Theory, p. 55, "ISI Channel Estimation Using Complementary Sequences," Jun. 25-30, 2000.

P. Spasojevic et al., IEEE Transactions on Information Theory, vol. 47, No. 3, pp. 1145-1152, "Complementary Sequences for ISI Channel Estimation," Mar. 2001.

P. Spasojevic, pp. 1-176, "Sequence and Channel Estimation for Channels With Memory," Dec. 1999.

3GPP TSG RAN WG1#16, XP-002215817, Mitsubishi Electric: "Sequences for the Node B synchronisation burst," pp. 1-6, Oct. 10-13, 2000.

TSGR1#3 (99) 205, XP002901242, Ericsson "New RACH preambles with low auto-correlation sidelobes and reduced detector complexity," pp. 1-8, Mar. 22-26, 1999.

Spasojevic, P., "Sequence and Channel Estimation for Channels with Memory—Chapter VI: Complementary Sequences for ISI Channel Estimation," Dec. 1999, Texas A&M University, Office of Graduate Studies, pp. 89-109.

Braun, V., "On Higher Order Autocorrelation Properties of Golay Complementary Sequences," Jun. 29, 1997, Information Theory. 1997. Proceedings., 1997 IEEE International Symposium, p. 16.

Budisin, S.Z., "New Complementary Pairs of Sequences," Jun. 21, 1990, IEEE Electronics Letters, vol. 26, No. 13, pp. 881-883.

Running et al., "A Method of Designing Pulse Compression Code Using Orthogonal Properties of Polyphase Code Matrix," 1990, Singapore ICCS/ISITA '92. 'Communications on the Move,' vol. 1, pp. 406-409.

B.M. Popovic, Electronics Letters, vol. 35, No. 17, pp. 1427-1428, "Efficient Golay Correlator," Aug. 19, 1999.

Ericsson, pp. 1-8, "New Rach Preambles With Low Auto-Correlation Sidelobes and Reduced Detector Complexity," Mar. 22-26, 1999.

* cited by examiner

SYNCHRONIZATION SIGNAL FOR SYNCHRONIZING BASE STATIONS

CROSS REFERENCE TO RELATED APPLICATIONS

This application is a divisional of U.S. patent application Ser. No. 11/184,917, filed Jul. 20, 2005, which is a divisional of U.S. patent application Ser. No. 10/192,639, filed Jul. 11, 2002, which is a divisional of U.S. patent application Ser. No. 09/962,271, filed Sep. 26, 2001, each of which is incorporated herein by reference in its entirety.

BACKGROUND OF THE INVENTION

Field of the Invention

The present invention concerns a signal for synchronizing base stations in a mobile radio telecommunication system. More particularly, the present invention concerns a signal for synchronizing base stations for a telecommunication system of the time division duplex (TDD) type. The telecommunication system is for example the system for which a standard is at present being drawn up, normally referred to as 3GPP W-CDMA TDD.

FIG. 1 depicts a radio frame of such a telecommunication system. It consists of fifteen time slots, some of which, for example the slots $IT_0$, $IT_1$, $IT_2$, $IT_5$, $IT_6$ and $IT_8$, are intended for conveying data (in the broad sense of the term) in the downlink direction (base station to mobile terminal) whilst others, the slots $IT_3$, $IT_4$, $IT_7$, $IT_9$, $IT_{10}$, $IT_{11}$, $IT_{12}$, $IT_{13}$ and $IT_{14}$, are intended for conveying data in the uplink direction (mobile station to base station). During a transmission slot, the data (D) are transmitted in the form of a sequence of symbols. The slot also includes a midamble (M) comprising pilot symbols enabling the channel to be estimated, a power control word (TPC) and a guard period (GP'). In such a system, several mobile terminals or base stations can transmit or receive data in the same time slot. The connections are differentiated by code division multiplexing (Code Division Multiple Access=CDMA). The symbols transmitted by or for the different users are spectrally spread, approximately at a "chip" frequency $1/T_c$ where Tc is the elementary transmission period.

Because the same frequency can be used both in the uplink direction and in the downlink direction, it is essential to ensure synchronization of the base stations. This is because, if such were not the case, a first mobile terminal transmitting at high power in an uplink channel could interfere with a second mobile channel, close to the first, receiving data over a downlink channel. The synchronization constraint between adjacent base stations is around a few microseconds (approximately 5) in the WCDMA TDD system.

To effect synchronization between base stations, several methods have been proposed in the state of the art. According to a first method, the synchronization is achieved by virtue of GPS receivers equipping the base stations. According to a second method, first of all, in an initial phase, for example during the phase of setting up the network or a new base station, an approximate synchronization is carried out (of around a few tens of ms, that is to say a few tens of thousands of "chips"). This rough initial synchronization is provided by the network, or more precisely by the radio access controller (RNC) controlling several adjacent base stations (also referred to as "B nodes"). A fine synchronization is then effected regularly by the radio interface between adjacent base stations. The purpose of this fine synchronization is notably to correct any difference in the sequencing clocks between adjacent base stations. To do this, certain time slots are reserved for the transmission and reception of a synchronization signal. A time slot dedicated to synchronization comprises essentially a synchronization signal (Sync) and a guard period (GP). Synchronization is obtained, in a manner known per se, by correlation of the received sequence with a sequence which is a replica of the one transmitted. The correlation is effected on a time window with a length given by the margin of accuracy of the approximate synchronization. Thus, when a base station receives a synchronization signal and detects a correlation peak in this window, it can synchronize its sequencing with that of the adjoining base stations.

The synchronization signal generally used is lengthy (a few thousands of "chips") in order to obtain good accuracy of correlation for an acceptable power per symbol. The guard period must be greater than the propagation time from a base station to an adjacent station so as to avoid, on reception, an encroachment of the synchronization signal on an adjacent time slot. The distance between two base stations being greater than the radius of a cell, the guard period (GP) is chosen so as to be greater than the normal guard period (GP'). The guard period (GP) must also take account of the difference between the frame clocks.

The synchronization signal is chosen so as to have good autocorrelation properties, namely a very pronounced autocorrelation peak. Generally the synchronization signals used are obtained from primitive polynomials on GF(2), a Galois field of cardinal 2. Such a sequence has a length L which is an $N_{th}$ power of 2 minus 1, that is to say $L=2^N-1$. This is the case notably for so-called Gold sequences proposed in the report TSGR1#15(00)0946 entitled "Sequences for the cell sync burst" of the Working Group TSG-RAN of the ETSI for synchronizing adjacent base stations.

Gold sequences have good periodic autocorrelation properties (the correlation of a sequence consisting of the repetition of a Gold sequence with a replica of the sequence of the latter does not have significant secondary peaks). On the other hand, these sequences unfortunately do not have such good aperiodic autocorrelation properties (correlation of an isolated Gold sequence with a replica). What is more, the correlator generally used operates in the time domain in the form of a conventional adapted FIR filter having a complexity in terms of O(L) which can be very high. In addition, the choice of the lengths of such sequences is reduced, since they can, as has been seen, take only values $2^N-1$ and a truncation would lead to a substantial loss of autocorrelation properties.

SUMMARY OF THE INVENTION

One purpose of the present invention is to propose a signal for synchronizing adjacent base stations by virtue of the transmission of a correlation sequence having very good autocorrelation properties and a wide choice of possible lengths, and this for a low degree of complexity of the correlator.

The present invention is defined by a signal for synchronizing base stations in a mobile radio telecommunication system in which a first base station transmits a synchronization signal having a first sequence followed by a second sequence, the first and second sequences being obtained from polyphase complementary sequences, and at least one second base station effects the correlation of the synchronization signal with a replica of the first sequence and a replica of the second sequence, the correlation results then being added in order to provide synchronization information.

Advantageously, the first and second sequences are Golay complementary sequences.

According to a first embodiment, the synchronization signal comprises guard times around the first and second sequences.

According to a second embodiment, the synchronization signal comprises a periodic extension of the first sequence followed by a periodic extension of the second sequence.

According to a third embodiment, the first sequence is generated by means of a first Golay sequence and a first ancillary sequence by successively multiplying the first Golay sequence by the bits of the first ancillary sequence.

Likewise, the second sequence can be generated by means of a second Golay sequence, complementary to the first Golay sequence, and a second ancillary sequence by successively multiplying the second Golay sequence by the bits of the second ancillary sequence.

Advantageously, the first ancillary sequence and the second ancillary sequence are Golay complementary sequences.

According to a variant embodiment, the correlation is effected by a trellis filtering.

BRIEF DESCRIPTION OF DRAWINGS

The characteristics of the invention mentioned above, as well as others, will emerge more clearly from a reading of the following description given in relation to the accompanying figures, amongst which.

DETAILED DESCRIPTION

The general idea at the basis of the invention is to use, for synchronizing adjacent base stations, a pair of complementary polyphase codes and more particularly a pair of Golay complementary codes. In the remainder of the description, mention will be made not of polyphase codes but of Golay codes. It is clear, however, that the invention applies to polyphase codes in general.

These complementary codes, known as such, have the remarkable property that the sum of their aperiodic autocorrelation functions is a Dirac function. In other words, if a pair of such complementary codes is denoted (A, B), this gives a $\Phi AA(m)+\Phi BB(m)=\delta(m)$ where m is the time index, $\delta$ the Kronecker symbol, and $\Phi$ the aperiodic autocorrelation function.

In addition, as described notably in the article by S. Z. Budisin, entitled "Efficient pulse compressor for Golay complementary sequences", published in Electronics Letters, Vol. 27, N°3, pages 219-220 in Jan. 1991, the correlator can be produced by virtue of a trellis filter having a complexity in terms of O(logL) rather than in terms of O(L) as in a conventional adapted FIR filter. This trellis filter is also referred to as an EGC filter, standing for Efficient Golay Correlator. An example of an embodiment of an EGC filter is given in the article by B. M. Popovic entitled "Efficient Golay Correlator", published in IEEE Electronics Letters, Vol. 35, N°17, Jan. 1999.

In addition, for a given authorized length, there are several possible Golay sequences. This is because, Golay sequences being generated by generator codes, it can be shown that two distinct generator codes with the same length generate Golay sequences which are also distinct and have the same length. These sequences have good intercorrelation properties (that is to say low intercorrelation values), enabling, for example, groups of base stations to use distinct codes or again to effect a synchronization of the base stations at different times of their sequencing.

Figure 1:
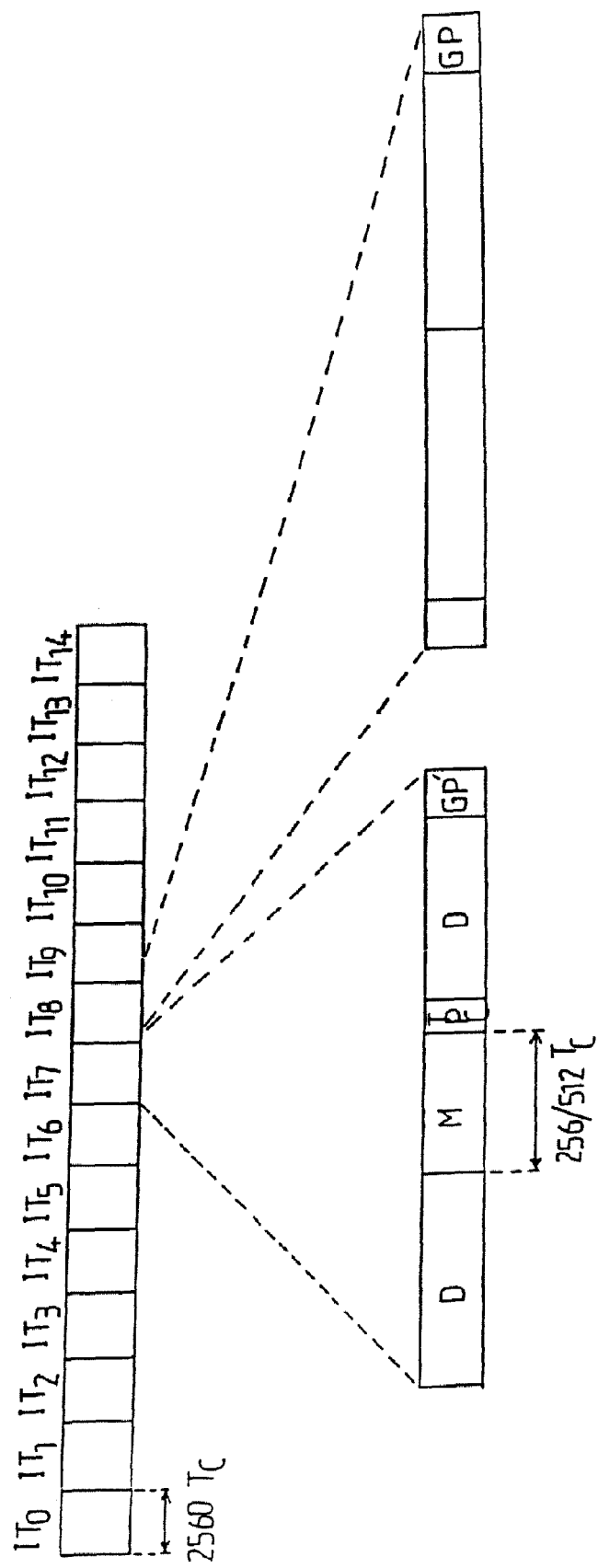
FIG. 1 depicts schematically a transmission frame of a transmission system of the W-CDMA TDD type.
Figure 2A:
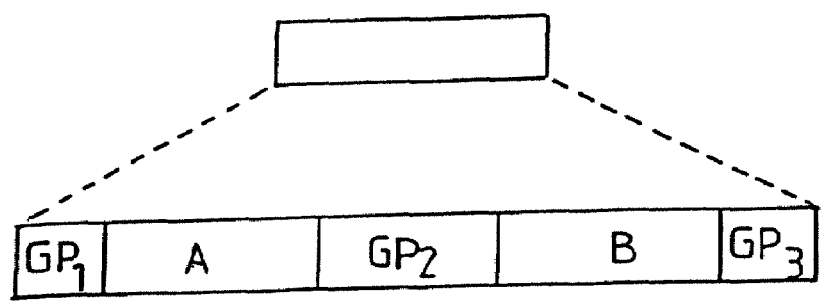
FIG. 2A depicts a first embodiment of the invention.

A first embodiment of the invention is illustrated in FIG. 2A. According to this embodiment, a synchronization signal consists of two Golay complementary sequences A and B multiplexed in time, each sequence being preceded and followed by a guard time, as described in the French application FR-A-9916851 filed on Dec. 30, 1999 in the name of the applicant. This synchronization signal is transmitted by a base station and is received by an adjacent base station. On reception, the synchronization signal is correlated with a replica of the sequence A and a replica of the sequence B, and the result of correlation with the sequence A is delayed so as to be aligned in time with the result of correlation with the sequence B before they are added, the Dirac peak being obtained when the replicas of A and B are aligned with the corresponding sequences. The presence of the guard times $GP_1$, $GP_2$ and $GP_3$ ensures that, at the time of correlation, the sequences A and B do not overlap the corresponding complementary replicas, namely B and A respectively, in a time window centered on the time alignment position. Thus secondary correlation peaks can result from the intercorrelation between sequences and complementary replicas are ejected out of this window. More precisely, if $GP_2=2.GP_3=2.GP_1=2.GP$, the sum of the two correlation results has an isolated Dirac peak in a window of width 2.GP around the time alignment position. The correlations are advantageously effected by EGC correlators, as mentioned above.

Figure 2B:
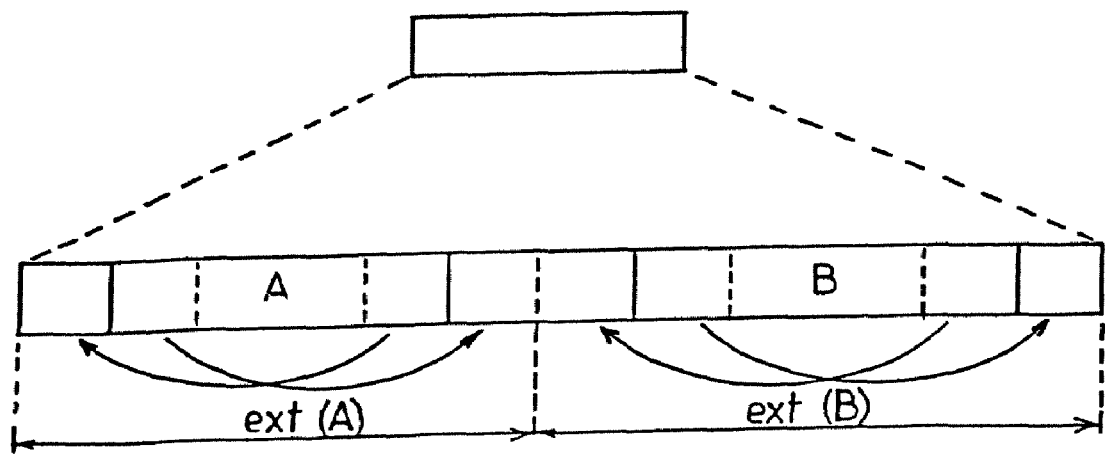
FIG. 2B depicts a second embodiment of the invention.

A second embodiment of the invention is illustrated in FIG. 2B. According to this embodiment, a synchronization signal consists of two Golay complementary sequences multiplexed in time, each sequence being preceded and followed by a periodic extension, as explained in the French application entitled "Channel estimation sequence and method of estimating a transmission channel using such a sequence" filed in the name of the applicant. The periodic extension of a given sequence is a truncation of the periodic sequence obtained by repetition of the sequence. To do this, it suffices to concatenate with the sequence to be extended a prefix corresponding to the end and a suffix corresponding to the start of the sequence. FIG. 2B indicates schematically the concatenation of prefixes and suffixes for two Golay complementary sequences A and B. The synchronization signal itself consists of two sequences thus extended ext(A) and ext(B). The periodic extensions produce the same advantages as the guard times, namely the absence of secondary correlation peaks around the Dirac peak in a certain time window. More precisely, if the suffixes and prefixes are of identical size and equal to E, the sum of the correlation results will have an isolated Dirac peak in a window of width 2.E around the time alignment position. This will easily be understood if the case is considered where the synchronization signal comprises completely periodised sequences A and B. The correlation with replicas of A and B then produces a series of Dirac peaks of period L. A periodic extension of size E amounts to truncating this series by a window of width 2.E around the time alignment peak. The advantage of this embodiment compared with the previous one is not to cause abrupt variations in signal power between the sequences A and B, at the transmitter amplifier. Such abrupt variations may generate high frequencies and intersymbol interference and consequently degrade the correlation results on reception.

Figure 2C:
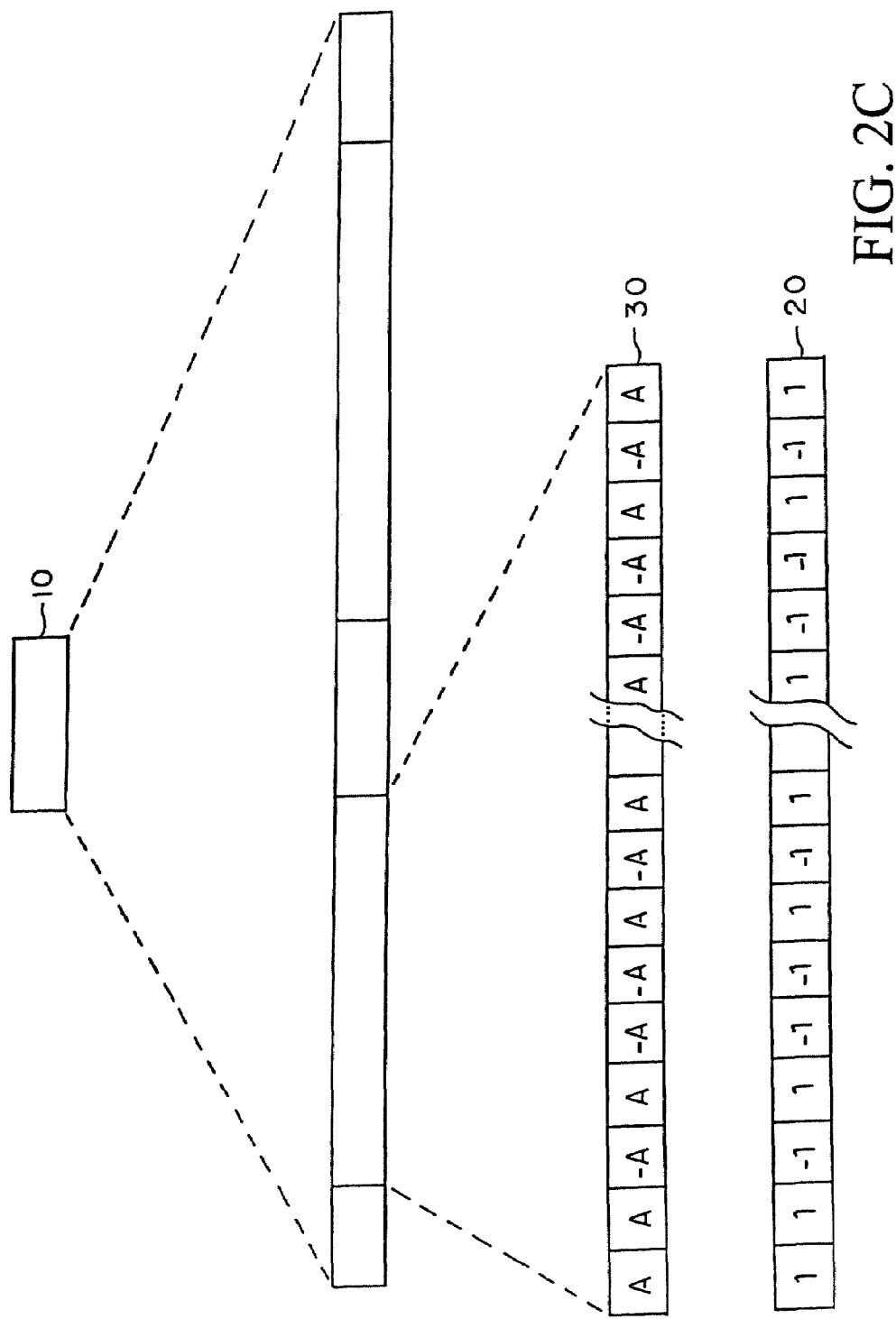
FIG. 2C depicts a third embodiment of the invention.

A third embodiment of the invention is illustrated in FIG. 2C. According to this embodiment, a composite sequence (10) is generated from a Golay code sequence A or B and an ancillary sequence X (20), according to the mode of constructing the hierarchical sequences. More precisely, the first bit of the ancillary sequence X (20) is multiplied successively by all the bits of the sequence A, and then the second bit of the second sequence by all the bits of the sequence A, and so on, and he sequences obtained are concatenated. Such a composite sequence will be noted below A*X (30), A being the base sequence and X being the generator ancillary sequence (20). The Golay complementary sequences A and B can thus be multiplied by ancillary sequences X, Y, identical or distinct, the latter also being able themselves to be Golay sequences Let A*X and B*X be composite sequences obtained from a pair A, B of Golay complementary sequences, of length L, extended by prefixes and suffixes of size E. A*X and B*X are multiplexed in time and separated by an interval W. The signal received is correlated with the sequence A on the one hand and with the sequence B on the other hand. The result of the first correlation is delayed by (L+2E)+W and is summed with the result of the second correlation. The sum obtained is a sequence R having a series of Dirac peaks of period L'=L+2E modulated by the values $x_0, x_1, \ldots, x_K$ where K is the length of the sequence X, each peak being surrounded by a window of width 2.E containing only zeros. The sequence R is then subjected to a filtering by means of a linear response filter:

$$H(z) = x_0 + x_1 z^{-L'} + \ldots + x_k z^{-KL'}.$$

The filtered sequence R includes a Dirac peak of height 2.K.L in the middle of a zero window of width 2.E which makes it possible to detect it easily. In addition, the total sequence consisting of the sequences A*X and B*X multiplexed in time is of total length 2.(L+2.E).K+W, which offers a wide choice of lengths of permitted sequences.

According to another variant embodiment, four composite sequences A*X, A*Y, B*X, B*Y are generated, where A, B form a first pair of Golay complementary sequences, extended or not, and X, Y form a second pair of Golay complementary sequences serving as generator ancillary sequences.

The composite sequences are multiplexed in time and separated by intervals which will be assumed to be equal and of width W. The sequences A and B are of length L'=L+2.E where L is the length of the basic sequence and E the size of the extension, the sequences X, Y being of length K. The total sequence length is therefore 4(L+2E)K+3W, which offers a wide choice of permitted sequence lengths.

Figure 3:
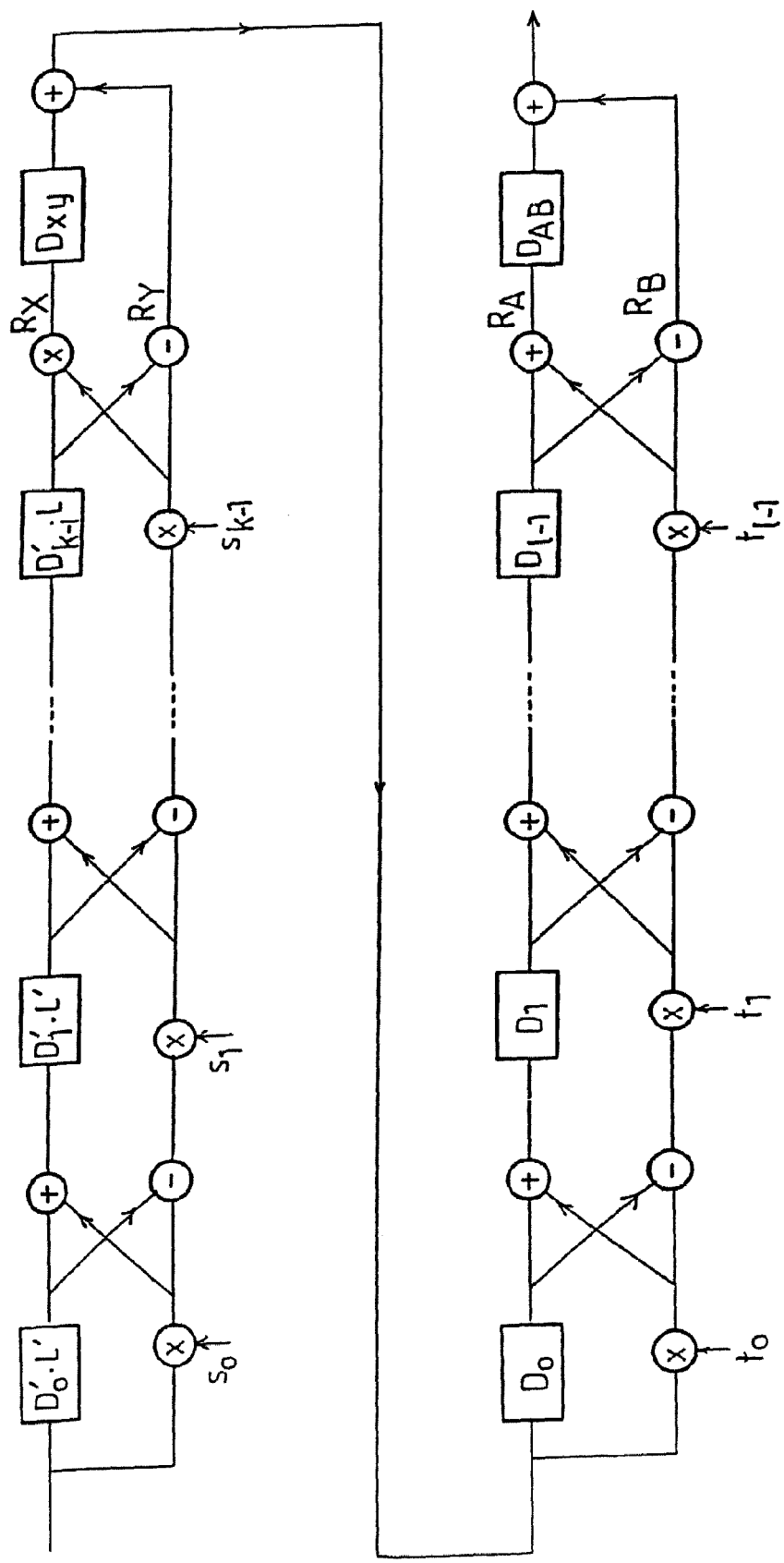
FIG. 3 depicts a correlator useful to the third embodiment of the invention.

The present variant takes advantage of the fact that there are L' pairs of complementary sequences (X,Y) in the form of sub-sequences $S_m$ and $S'_m$ with $S_m(n)=(A*X)_{n.L'+m}$ and $S'_m(n)=(B*X)_{n.L'+m}$, $m=0, \ldots, L'-1$ obtained by decimation of the initial total sequence. Instead of effecting a correlation with an EGC correlator, a "hierarchical" correlator is used, the first stage of the EGC function correlator modified as depicted in FIG. 3.

It will be assumed that the pair of sequences X and Y has been generated conventionally by an elementary sequence $S_0, \ldots s_{k-1}$, where $K=2^k-1$, and delays $D'_0, D'_1, \ldots, D'_{k-1}$ with $D'_i=2^{P_i}$ where $(P_0, P_1, \ldots, P_{k-1})$ is a permutation on the set (0, 1, \ldots, k-1), recursively as follows:

$$X_0(i) = \delta(i); Y_0(i) = \delta(i);$$

$$X_n(i) = X_{n-1}(i) + s_{n-1} \cdot X_{n-1}(i-D'_i); Y6hd\, n(i) = Y_{n-1}(i) - s_{n-1} \cdot Y_{n-1}(i-D'_i);$$

Likewise, it will be assumed that the pair of sequences A, B was generated by the elementary sequence $t_0, \ldots, t_{l-1}$, where $L=2^l-1$, and delays $D_0, D_1, \ldots, D_{k-1}$ with $D_i=2^{P_i}$ where $(P_0, P_1, \ldots, P_{l-1})$ is a permutation on the set (0, 1, \ldots, l-1).

The first correlation stage effects a correlation with the pair of sequences X, Y, but differs from a conventional EGC correlator in that the delays have been multiplied by a factor L' in order to take account of the scattering in the samples. The two correlation results are added after time alignment by a delay $D_{XY}$, the delay $D_{XY}$ separating the sequences A*X and A*Y, on the one hand, the sequences B*X and B*Y, on the other hand. The second stage of the correlator effects the correlation with the pair of sequences A, B and is conventional per se. The correlation results are aligned in time by a delay $D_{AB}$ and added, the delay $D_{AB}$ corresponding to the difference in time between the sequences A*X and B*X on the one hand and the sequences A*Y and B*Y on the other hand.

The correlator thus formed first of all effects a rough correlation with a step L' and then a fine correlation to the sampling step. Its complexity is low since the number of operations performed is in O(log(K)+log(L)).

Although the example described above has only two sequence levels and two correlation levels, the invention can be extended in an immediate manner to any number of levels of sequences and corresponding stages of the hierarchical correlator.

The invention claimed is:

1. A base station of a mobile radio telecommunication system comprising:
   receiving unit configured to receive a synchronisation signal comprising a first polyphase sequence and a second polyphase sequence following said first polyphase sequence,
   said second polyphase sequence being complementary to said first polyphase sequence and directly connected to said first polyphase sequence by at least one of a periodic extension of said first polyphase sequence and a periodic extension of said second polyphase sequence,
   wherein said periodic extension of said first polyphase sequence being a truncated replica of said first polyphase sequence, and said periodic extension of said second polyphase sequence being a truncated replica of said second polyphase sequence; and
   correlation unit configured to perform a correlation procedure based on the received synchronisation signal for synchronising the base station with a neighbouring base station.

2. The base station of a mobile radio telecommunication system according to claim 1, wherein said first polyphase sequence comprises a first Golay sequence and said second polyphase sequence comprises a second Golay sequence which is complementary to said first Golay sequence.

3. A method for synchronising a base station with a neighbouring base station comprising:
   receiving a synchronisation signal comprising a first polyphase sequence and a second polyphase sequence following said first polyphase sequence,
   said second polyphase sequence being complementary to said first polyphase sequence and directly connected to said first polyphase sequence by at least one of a periodic extension of said first polyphase sequence and a periodic extension of said second polyphase sequence,
   wherein said periodic extension of said first polyphase sequence being a truncated replica of said first polyphase sequence, and said periodic extension of said second polyphase sequence being a truncated replica of said second polyphase sequence; and performing a procedure for synchronising the base station with the neighbouring base station based on the received synchronisation signal.

4. A method for synchronising a base station with a neighbouring base station according to claim 3, wherein said first polyphase sequence comprises a first Golay sequence and said second polyphase sequence comprising a second Golay sequence which is complementary to said first Golay sequence.

* * * * *